United States Patent [19]
Anderson et al.

[11] 3,782,202
[45] Jan. 1, 1974

[54] METHOD AND APPARATUS FOR BALANCING SEGMENTED PARTS

[75] Inventors: Ronald W. Anderson, Champaign, Ill.; William B. Henry, Chelsea, Mich.

[73] Assignee: Balance Technology, Inc., Ann Arbor, Mich.

[22] Filed: Apr. 20, 1972

[21] Appl. No.: 245,814

[52] U.S. Cl. .................................... 73/455, 73/483
[51] Int. Cl. ............................................. G01m 1/12
[58] Field of Search .................................................
      73/482–487, 455–456

[56] References Cited
UNITED STATES PATENTS
2,108,624   2/1938   Thearle ............................. 73/455
3,188,869   6/1965   Lash .................................. 73/483

*Primary Examiner*—James J. Gill
*Attorney*—Arthur Raisch et al.

[57] ABSTRACT

A segmented part such as a fan blade is supported on a spherical air bearing so that unbalance in the blade causes the bearing to tilt. Displacement of the bearing is sensed by a pair of orthogonally oriented transducers, and the displacement signals therefrom are processed to provide a direct readout of the two specific blades to which weight must be added or subtracted and a direct readout of the amount of unbalance correction required at each blade. The air bearing has a particular stop arrangement to prevent rotation of the bearing while permitting the bearing to tilt along the orthogonal axes of the transducers. The circuit that processes the transducer displacement signals is selectively adjustable so that direct readings can be obtained for parts having different numbers of segments.

26 Claims, 10 Drawing Figures

METHOD AND APPARATUS FOR BALANCING SEGMENTED PARTS

This invention relates to a method and apparatus for balancing segmented parts and more particularly to signal processing techniques and circuits and signal readout techniques and circuits for use in balancing parts having different numbers of segments.

Ship propellers, fan blades, pulleys with spokes and other parts having radial segments often require the addition or removal of material on the blades or the segments in order to balance the part. Heretofore, it was necessary to design or preset electronic circuits to determine the amount and location of balance correction required at segments or blades. For example, machines have been factory designed to read unbalance correction for a fan having three blades, but the same machine could not be used to balance a fan with four or more blades without major modification. Other known techniques require reasonably complex setup and considerable operator skill to determine the amount of unbalance correction at the appropriate blades when the number of blades on the part being balanced is changed. For example, "vectormeter" or oscilloscope readout requires interpretation or analysis by the operator which is relatively slow and not accurately repeatable by an unskilled operator.

Another difficulty arises in static balancing machines of the type used to balance segmented parts in that the bearing supporting the part must prevent rotation about a central axis without constraining tilting of the same axis. Commonly, gimbals which have been used require a complex framework to locate and hold the journal bearings, and special manufacturing care must be taken to assure proper alignment of the journals. The problem of preventing rotation of the bearing about a central axis is particularly critical in certain static balancing machines having transducers oriented at precise orthogonal positions relative to the bearing. Deviation in the relative positioning of the transducers to the bearing will cause inaccuracies in the unbalance correction readouts obtained from the transducer displacement signals. Although a spherical air bearing permits deflection along any axis through the center of the spherical bearing, the bearing is also free to rotate and hence would be unacceptable without modification to prevent rotation thereof.

Among the objects of the present invention are to provide a method and apparatus for balancing segmented parts that automatically determine the amount and location of unbalance in the part; that automatically indicate, as by visual means such as lights and the like, the particular boundary or part segments at which an unbalance correction must be made; that automatically indicate the amount of unbalance correction at physical locations on a segmented part; that facilitate rapid and simple setup by unskilled persons when parts having different numbers of segments are balanced; that eliminate interpretation of unbalance data by the operator, particularly where the operator is balancing different parts with different numbers of segments; that provide an unambiguous, direct readout of the amount and location of unbalance correction required at physical locations on the segmented parts; that compensate for eccentricity in a fixture mounting the part; and/or that are substantially more versatile, accurate and repeatable by comparison to prior art techniques, particularly where unbalance corrections must be determined for parts having different numbers of segments.

Other objects, features and advantages of the present invention will become apparent in connection with the following description, the appended claims and the accompanying drawings in which:

FIGS. 9 a-f are waveform diagrams useful in understanding the present invention.

Figure 1:
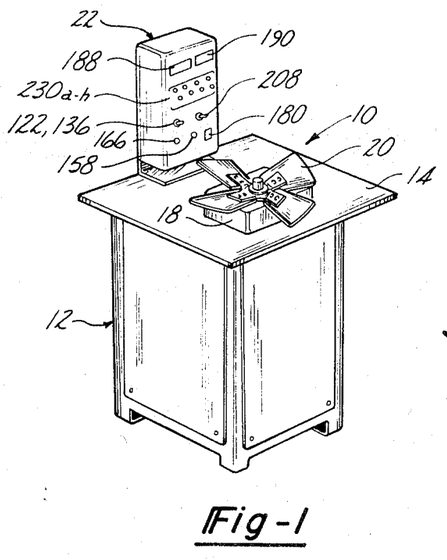
FIG. 1 is a perspective view of a balancing machine of the present invention.

Referring to the drawings in greater detail, the balancing machine 10 generally comprises a hollow base housing 12 closed at its top by a panel 14 on which a spherical air bearing assembly 16 is mounted. Bearing 16 is enclosed by a hollow housing 18 and is adapted to support a fan 20 or other segmented part to be balanced. A control panel 22 is also suitably mounted on the balancing machine 10.

Figure 3:
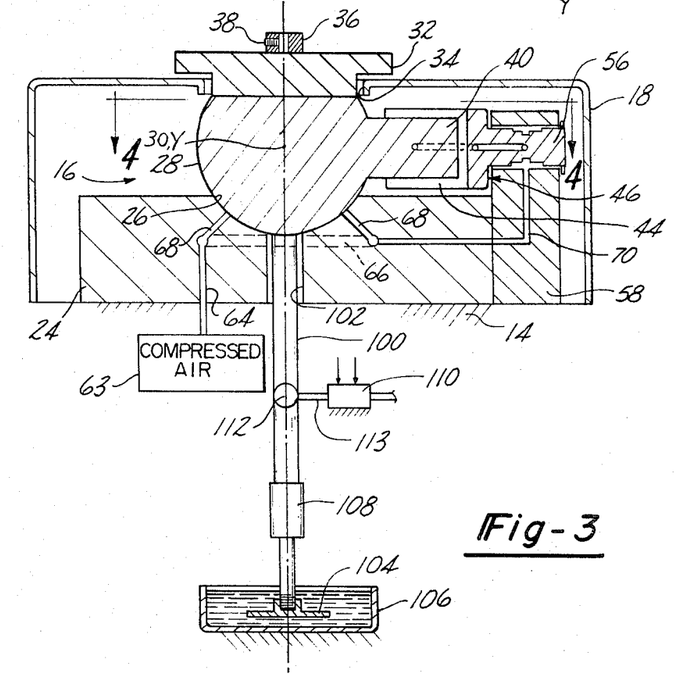
FIG. 3 is a fragmentary vertical sectional view taken on line 3—3 of FIG. 2 with the fan removed.
Figure 4:
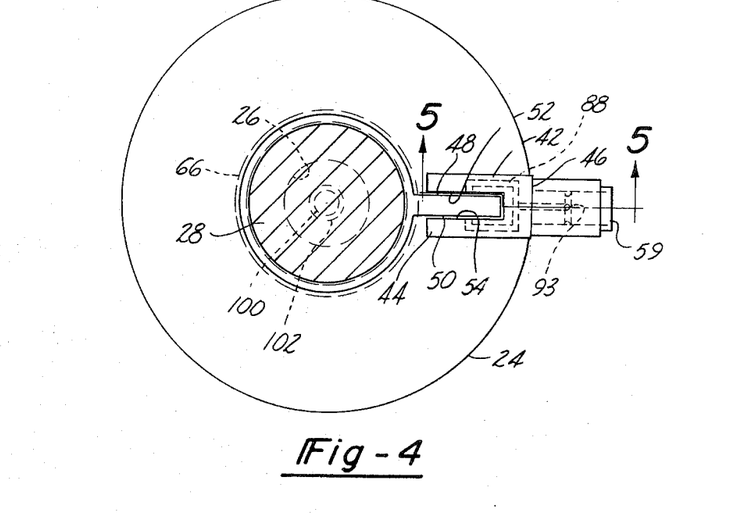
FIG. 4 is a partly view, parly in section, of the spherical bearing taken on line 4—4 of FIG. 3.
Figure 5:
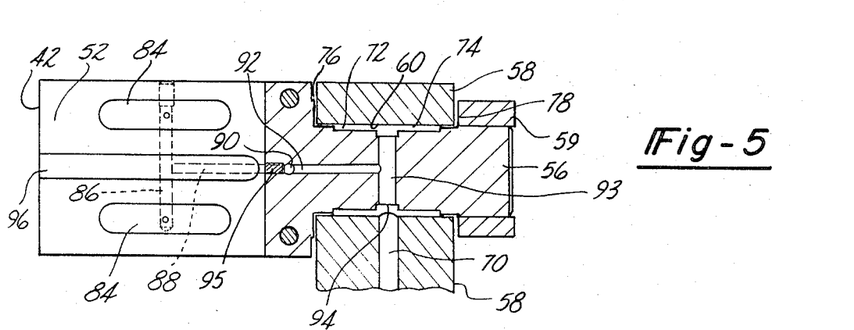
FIG. 5 is an enlarged vertical section taken on line 5—5 of FIG. 4.
Figure 6:
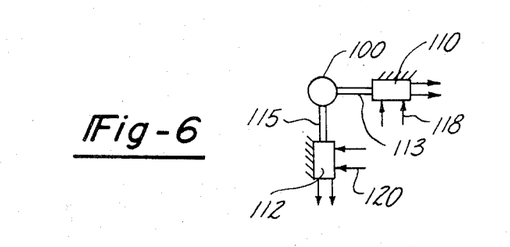
FIG. 6 is a view showing orthogonal displacement transducers responsive to displacement of a pendulum shaft on the bearing.

The bearing assembly 16 comprises a socket base 24 fixedly mounted on panel 14 and having a spherical concave socket 26 that receives a ball 28 for generally universal movement of the ball 28 in the socket 26 about a center 30. Fixedly mounted on the top of ball 28 is a table 32 that extends upwardly through an aperture 34 in the housing 18. An annular collar 36 fastened on table 32 has a set screw 38 which serves as a fixture for mounting fan 20 on the bearing assembly 16 with the rotational axis of fan 20 aligned with a vertical Z axis of the bearing assembly 16. It will be understood that other types of mounting fixtures could be used in place of collar 36 for accommodating a wide variety of parts. Ball 28 also has an integral vane 40 that projects laterally outwardly therefrom along a horizontal X axis of the bearing assembly, toward the right as viewed in FIGS. 3 and 5. The free end of vane 40 is disposed between two arms 42, 44 of a bifurcate bearing yoke 46. As will later be described in greater detail, opposed flat vertical faces 48, 50 on the vane 40 are closely spaced with respective complimentary flat vertical faces 52, 54 on the respective arms 42, 44 so that a sliding air bearing can be formed therebetween when ball 28 pivots on a Y axis of the bearing assembly 16. Yoke 46 also has a shank portion 56 of circular cross section that projects through and is journalled in a vertical support 58 by an air bearing 60 so that the yoke 46 is free to rotate on the X axis. Yoke 46 is held in place against axial shifting by a collar 59 fastened on the free end of shank 56.

Compressed air from a suitable supply 63 is fed into base 24 via an intake passage 64 and thence to a circular passageway 66 in the base from which the air is ported to the interface between socket 26 and ball 28 via suitable passages 68 to provide an air bearing between the ball and the socket. Air in passageway 66 is also supplied via passage 70 to a wide, shallow circumferential groove 72 in shank 56 to provide an air journal bearing between the shank and the bore 74 in support 58. Air from the journal groove 72 is partially vented at opposite end faces of the support 58 to provide air thrust bearings indicated at 76, 78. Compressed air from journal groove 72 is also supplied to a pair of vertically spaced ports 84 in face 52 by a first T passage 86, a straight passage 88, a T passage 90, and a straight passage 92 that communicates with a narrow circumferential groove 94 stepped radially inwardly from groove 72. Compressed air at ports 84 provides the air bearing between faces 48, 52 with excess air being exhausted by a longitudinal groove 96. Similarly, air from the T passage 90 is fed to corresponding ports in the face 54 of arm 44 to provide an air bearing between faces 50, 54. A trim screw 95 at the junction in T 90 adjusts the amount of air passing to the ports 84 and the corresponding ports in face 54. From the arrangement of bearing assembly 16 as shown and described, it will be apparent that the air bearing between faces 48, 52 and 50, 54 allow ball 28 to freely pivot on the Y axis and additionally maintain vane 40 centered between arms 42, 44 when ball 28 pivots on the X axis.

A pendulum shaft 100 fastened on the lower end of ball 28 projects downwardly through a suitable aperture 102 in base 24. A friction disc 104 threaded on the lower end of shaft 100 is disposed in a stationary cup 106 that contains a suitable liquid friction media such as a silicone fluid. Disc 104 cooperates with the bottom of cup 106 to provide true viscous damping. The degree of damping is readily adjusted by varying the separation between disc 104 and the bottom of cup 106. A suitable counterweight 108 is also fastened on shaft 100. Counterweight 108 and damping via disc 104 cause bearing assembly 28 to reach a new equilibrium position rapidly. Displacement of shaft 100 along the X axis is sensed by a suitable transducer 110 and displacement along the Y axis is sensed by transducer 112. Transducers 110, 112 may be linear voltage differential transformers having respective movable cores 113, 115 (FIGS. 3 and 7) interengaged with shaft 100.

Figure 7:
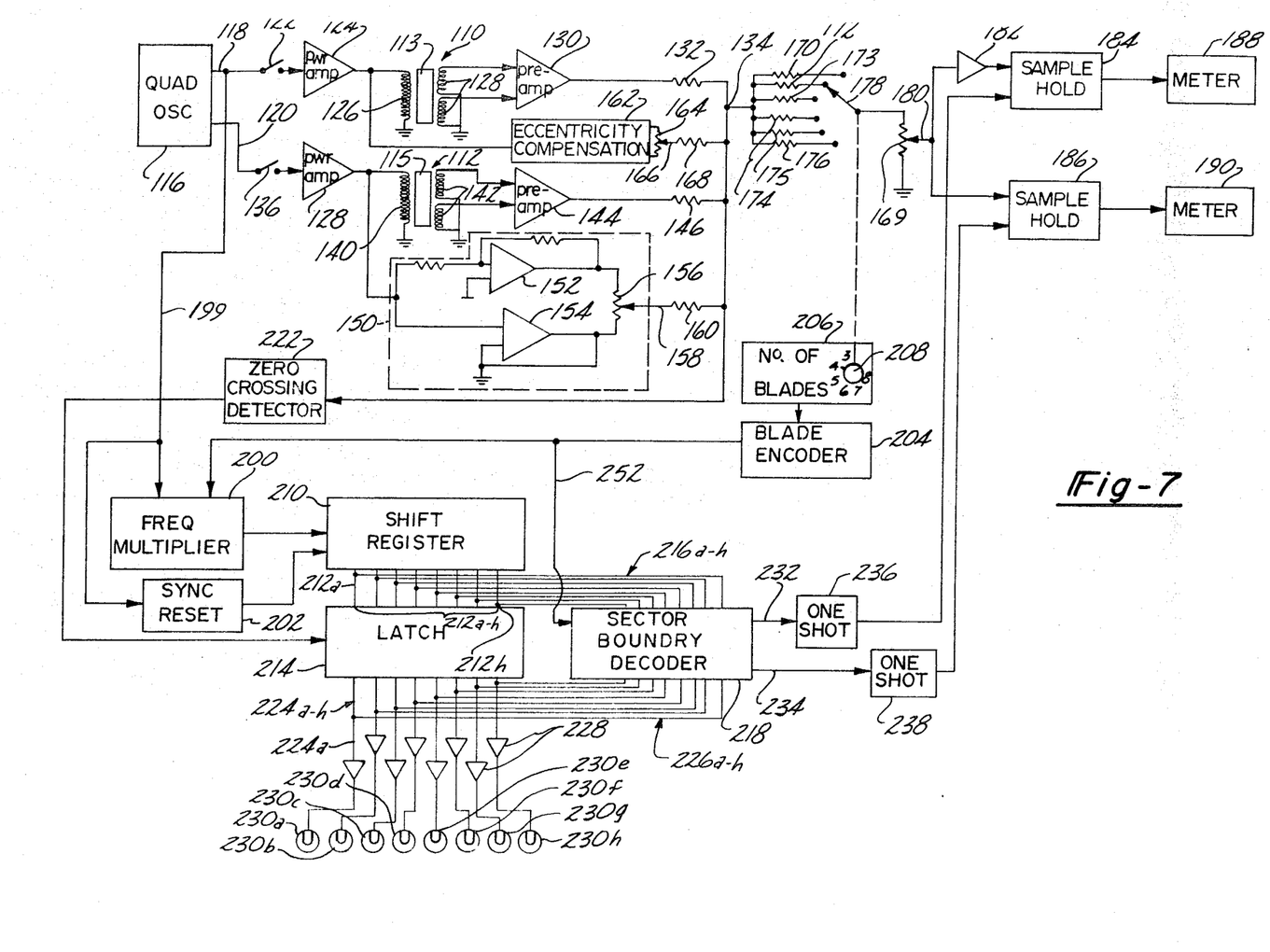
FIG. 7 is a circuit diagram, partly in block diagram and partly in schematic circuit diagram, of the circuit for developing and processing the transducer displacement signals and displaying the amount and location of unbalance correction required.

Referring to the circuit of FIG. 7, a quadrature oscillator 116 supplies quadrature signals at its respective output lines 118, 120; i.e., a sine function on line 118, and a cosine function on line 120. The sine function signal on line 118 is fed via a switch 122 and an amplifier 124 to a supply coil 126 of transducer 110. Output signals developed at bucking pickup coils 128 are fed via an amplifier 130 and a summing resistor 132 to a summing point 134. Similarly, the cosine function signal at line 120 is fed via switch 136 and amplifier 138 to a supply coil 140 in transducer 112 with the pickup signals at coils 142 being fed via an amplifier 144 and a summing resistor 146 to the summing point 134. A portion of the supply signal across coil 140 is also fed to an eccentricity compensation circuit 150 which comprises a pair of operational amplifiers 152, 154 whose outputs are connected to opposite ends of a potentiometer 156 having a wiper 158 connected to summing point 154 via a summing resistor 160. Amplifiers 152, 154 are arranged so that wiper 158 can pick off a compensating signal at a selected level and either in phase or 180° out of phase with the signal at coil 140. Similarly, the signal applied to coil 126 is fed through a similar eccentricity compensation circuit 162 whose output is developed at a potentiometer 164 having a wiper 166 connected to the summing point 134 via a summing resistor 168.

The summed signal at point 134 is in turn fed to a potentiometer 169 through one of six resistors 170, 172, 173, 174, 175, 176 selected by a rotary switch arm 178. As will later be described in greater detail, each of the respective resistors 170-176 corresponds to the number of segments, from three to eight segments on the part, to which weight can be added or subtracted. Resistors 170-176 scale the summed signal at point 134 according to the factor $1/\sin(a+b)$ where $\sin(a+b)$ is equal to the sine of the included angle between equally spaced apart segments on the part, for example, the sine of 90° in the case of a four-bladed fan. The output signal taken at wiper 180 is fed via an inverting amplifier 182 to a first sample-and-hold circuit 184 and simultaneously fed directly to a second sample-and-hold circuit 186. The samples taken at circuits 184, 186 in a manner to be described are in turn fed to respective output meters 188, 190 which visually indicate the amount of unbalance correction required at two adjacent segments of the part, i.e., adjacent blades of fan 20. Potentiometer 169 can be adjusted to calibrate meters 188, 190 to read unbalance directly in ounce-inches. A second potentiometer could be connected in series with potentiometer 169 so that unbalance can be read directly in weight units at a given correction radius, for example, in the manner disclosed in U.S. Pat. No. 3,608,381.

Figure 2:
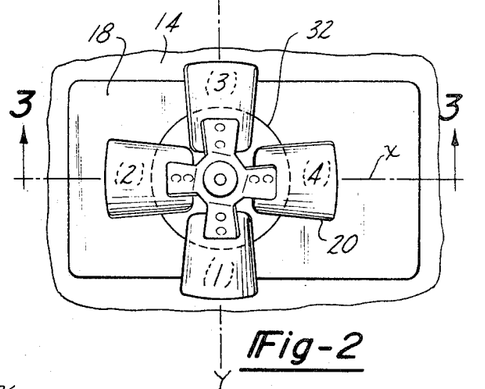
FIG. 2 is an enlarged fragmentary top view of the balancing machine of FIG. 1 showing a four-bladed fan on a spherical bearing.

The sine function signal on line 118 is also fed via line 199 to a frequency multiplier circuit 200 and to a synchronous reset circuit 202. Circuit 200 also receives a binary number signal from a blade encoder circuit 204 identifying the number of blades or segments on the part. Encoder 204 is set by means of a selector switch 206 having a suitable knob 208 by which an operator sets the appropriate number of segments. Knob 209 also controls the rotary switch arm 178 to select the correct one of the resistors 107-176. In response to the sine function signal on line 118 and the binary number from encoder 204, frequency multiplier 200 develops a clock output whose frequency is a multiple of the input signal on line 118 selected according to the number of segments. For a sine function signal $f_o$, the clock output of circuit 200 will be at a frequency of $nf_o$ or $4f_o$ for the case of a four-bladed fan 20. The output from circuit 200 clocks an eight-stage shift register 210 which is synchronized with the sine function signal on line 118 by a reset signal from circuit 202. At each positive-going zero crossing of the sine function signal on line 118, register 210 is reset by entering a ONE in the first register stage so that with the next clock after the zero crossing the ONE is shifted from the first register stage. Register 210 has eight output lines 212a-h which represent the state of each register stage. Lines 212a-h are coupled directly to an eight-bit latch circuit 214 and via lines 216a-h to a sector boundary decoder 218. Latch circuit 214 also receives a latch command from a positive-going zero crossing detector 222 whose input is taken at the summing point 134. In response to a zero crossing of the summed unbalance signal at point 134, latch circuit 214 samples lines 212a–h and stores the location of the ONE in register 210. The stored lcoation in latch circuit 214 provides an output signal on the corresponding one of the output lines 224a–h which in turn are connected via lines 226a–h to decoder 218 and through suitable power amplifiers 228 to respective lamps 230a–h. Each of the lamps 230a–h is associated with a respective sector of a circle; i.e., lamp 230a when lit indicates that unbalance occurs in a sector (N,1) (FIG. 8) between the highest segment or blade N and the next adjacent segment "1". Hence lamp 230a would be marked "(N,1)". Similarly, lamp 230b is associated with and marked for the sector (1,2) bounded by segments "1" and "2" and so on with lamp 230g being associated with and marked "(6,7)" and lamp 230h being associated with and marked "(7,8)". As will later be described in greater detail, if lamp 230a is lit, it indicates the location of the unbalance within the sector (N,1) and hence indicates that weight or unbalance correction must be made on the segments (sector boundaries), i.e., the blades of fan 20, designated "N" and "1". In a similar fashion, if lamp 230g were lit when an eight-bladed fan is being balanced, it would indicate that unbalance correction must be made on the sixth and seventh blades. In this regard, the operator only needs to know that the highest blade number displayed is the blade coincident the positive X axis as shown in FIGS. 2 and 8.

Referring in greater detail to the circuit of decoder 218 as shown in. FIG. 10, except as noted hereinafter with respect to line 216a, each output line 216a–h is connected to one input of a respective NAND gate 240a–h and also to one input of a respective NAND gate 242a–h in the manner illustrated. Similarly, each of the latch circuit output lines 226a–h is connected to the other input of a respective gate 240a–h and also to the other input of a respective gate 242a–h. By way of further illustration, gate 240a has inputs from lines 216a and 226a, gate 242a from lines 226a, 216b and so on with gate 242g from lines 226g and 216h and gate 240h from lines 216h and 226h. It is noted that line 216a is connected to gate 240a and also to gate 242h for reasons that will later be apparent. The other input of gate 242h is supplied from a sector data selector circuit 250 which receives a binary number signal from encoder 204 on line 252 and also receives input signals from the last six stages of latch circuit 214 via lines 226c, d, e, f, g, h. The outputs of gates 240a–h are fed to a common output resistor 260 which develops strobe signals on line 232 for sample-and-hold circuit 184; whereas the outputs of gates 242a–h are fed to a common output resistor 262 that develops the strobe signal on line 234 for sample-and-hold circuit 186. In a manner that will later be described in greater detail, when the unbalance is located between two segments, e.g., between adjacent blades on fan 20, one of the gates 240 will be enabled corresponding to an adjacent segment in a counterclockwise direction (as viewed in FIGS. 2 and 8); and then one of the gates 242 will be enabled corresponding to an adjacent segment in a clockwise direction. Hence the pair of strobe signals developed on output lines 232, 234 are shaped by respective one-shot multivibrators 236, 238 and fed to the respective sample-and-hold circuits 184, 186.

Figures 8, 9, 10:
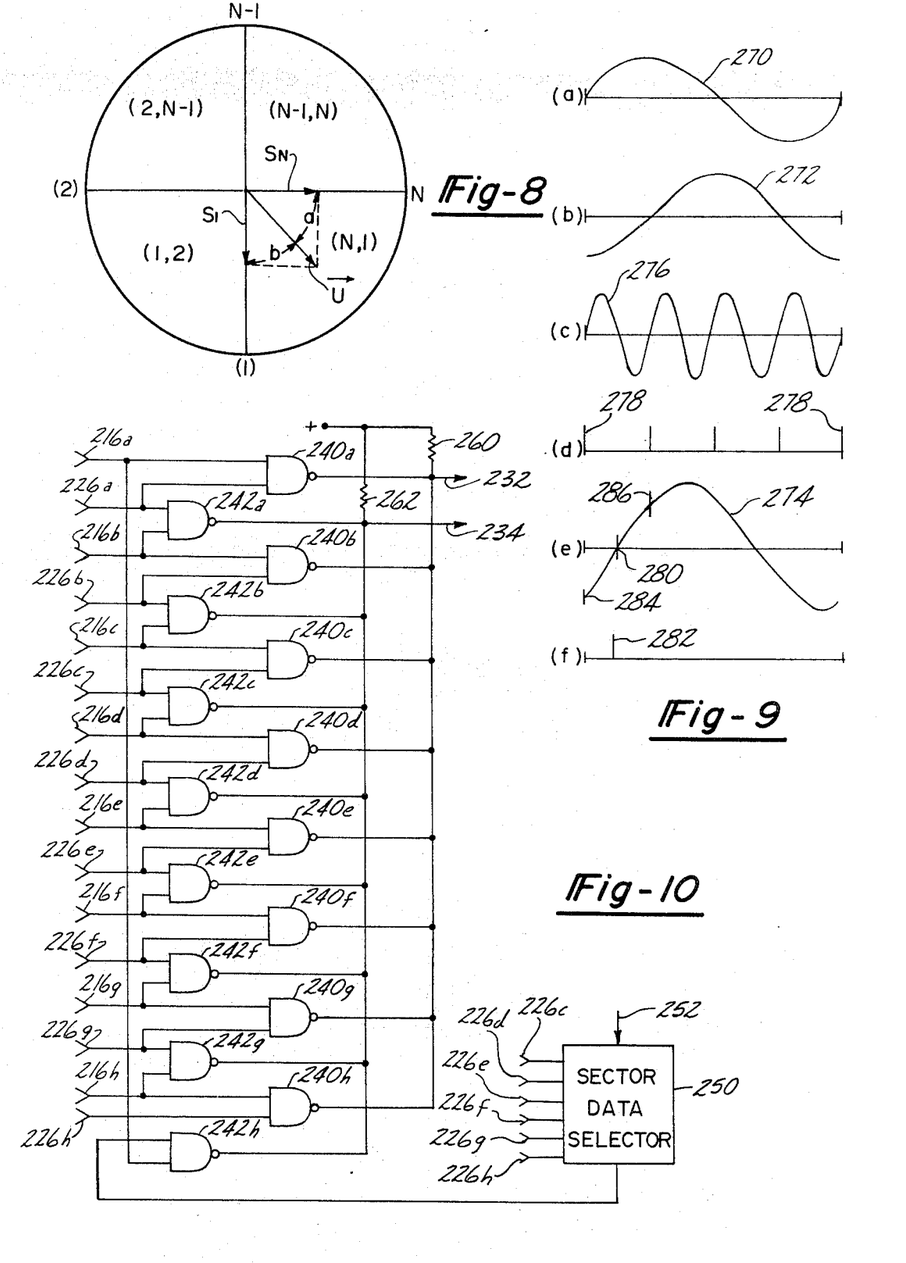
FIG. 8 is a diagram useful in understanding the present invention.
FIG. 10 is a circuit diagram of the sector boundary decoder in the circuit of FIG. 7.

Before describing the operation of the balancing machine described, further reference to FIG. 8 will be helpful to understanding the machine and operation thereof. A segmented part may be considered as having N segments which equally divide the part into a corresponding number of sectors; for example, if N is four, the part into four sectors. In the general case, the sectors (N,1), (1,2)... (N−1,N) are defined by boundaries N,1,2...(N−1),N which are radial centerlines of the segments originating at the center of the circle. The sum of the included angles of these sectors equals exactly 360° and the sectors are not overlapping. Assuming an unbalance in the part represented by an unbalance vector $\vec{U}$ located in the sector (N,1), the components of the vector can be resolved to the adjacent sector boundaries N and 1 and the magnitude of the resolved components $|S_n|, |S_1|$ can be defined by the following equations:

$$|S_n| = |\vec{U}| [\sin b/\sin (a+b)]$$

$$|S_1| = |\vec{U}| [\sin a/\sin (a+b)]$$

Hence to determine the necessary balance correction, one has to determine in which sector the unbalance lies, its angular relationship with respect to the two boundaries of that sector and then solve the above equations for that amount of correction necessary on the two boundaries. In FIG. 8, it has been assumed that N is four and, in the description hereinafter, it is assumed that the No. 4 blade of fan 20 is centered on the positive X axis, i.e., the right-hand blade as viewed in FIG. 2. Although the balancing machine is being described specifically in connection with a part having four segments, i.e., a four-bladed fan 20, it will be understood that the above analysis applies equally as well to any number of segments. Additionally, the balancing machine described specifically herein has the capability of providing the necessary unbalance corrections and boundary locations for parts having from three segments up to eight segments.

Referring now to the overall operation of the balancing machine described hereinabove, a balanced fan is first fastened on bearing assembly 26 by means of collar 36 and the eccentricity compensation circuits 150, 162 are set to eliminate the effect of any eccentricity in the mounting fixture or the mounting fixture in combination with the fan 20 or other part to be balanced. This is accomplished by closing switch 122 and opening switch 136 so that only transducer 110 is energized. The operator then notes the reading on meter 188, rotates the fan 20 180°, again noting the reading on meter 188, and then adjusts potentiometer 166 until the readings at meter 188 are the same for both positions of fan 20. The same process is repeated with switch 122 open and switch 136 closed to compensate for eccentricity on the Y axis by adjusting potentiometer 158 so that meter 190 gives the same reading for two positions of fan 20 180° apart. Next meters 188, 190 are calibrated for direct readout by using the balanced fan and adding a known amount of unbalance on the X axis, for example, and then adjusting wiper 180 until the meter reads the known amount of unbalance. The balanced fan is then replaced with the fan to be balanced, and switches 122, 126 are then both closed for the balancing operation. Preferably, potentiometers 164, 156 and 169 are calibrated with suitable indicia so that once the settings have been determined for a particular type of part, the potentiometers 164, 156, 169 can be reset to the desired position each time that type of part is to be balanced without going through the above described compensation and calibration steps.

With the unbalanced fan 20 in place, any unbalance in the fan will cause bearing assembly 16 to rotate about its center 30, causing shaft 100 to tilt. Transducers 110, 112 develop respective unbalance component signals whose amplitude and phase represent the amount and direction of displacement of shaft 100 along the respective X and Y axes and the signals are amplified and then summed at point 134 along with the eccentricity compensation signals. By way of example, the waveform 270 in FIG. 9a illustrates the sine function signal on line 118; the waveform 272 in FIG. 9b illustrates the cosine function signal on line 20; and the waveform 274 in FIG. 9e may be considered as illustrating an unbalance signal for an unbalance located in sector (4,1) approximately midway between blades 4 and 1, i.e., at 45° to the X and Y axes as illustrated by the vector $\vec{U}$ in FIG. 8. The unbalance signal 274 is scaled via resistor 172 and fed to the two sample-and-hold circuits 184, 186. As indicated earlier, resistor 172 will scale the resultant signal 274 by a factor $1/\sin(a+b)$. Since in the example selected fan 20 has four blades, $\sin(a+b)=1$. Since the sine function 270 and the cosine function 272 both are sinusoidal, the unbalance signal 274 will also be sinusoidal both before and after scaling by resistors 170-176.

Assuming that a frequency of the sine and cosine signals 270, 272 are at a frequency $f_o$, and that the selector switch 206 has been set to numeral "4", circuit 200 will develop a signal at a frequency of $4f_o$ as illustrated at 276 (FIG. 9c) and provide the corresponding clock signals 278 to the shift register 210. In response to the zero crossing of the sine wave 270 at line 118 and the first clock pulse, register 210 is reset to have a ONE in its first stage which in general represents boundary N and specifically the fourth blade. Hence in response to the next clock pulse 278, i.e., the second pulse in FIG. 9d, register 210 will shift to its second stage and so on up to the fourth stage in response to the fourth clock. However, the fifth clock pulse and the conicident reset pulse from circuit 202 cause register 210 to reset the ONE back into the first stage.

While register 210 is being shifted, each time the summed unbalance signal 274 at point 134 crosses zero in a positive-going direction, latch circuit 214 receives a command instruction to store the location of the ONE in register 210. In the example being described, the unbalance signal 274 crosses zero at 280 (FIG. 9e) while the ONE in register 210 is in the first register stage as indicated by a pulse 282 (FIG. 9f). This causes lamp 230a to light indicating that the unbalance is within the sector "(N,1)". Simultaneously, line 226a is activated which readies gates 240a and 242a. As the count in register 210 progresses and recycles each time the ONE is at the first stage in the register, line 212a and line 216a are activated to enable gate 240a; and each time the ONE is shifted to the second stage, lines 212b and 216b are activated to enable gate 242a. When gate 240a is enabled, multivibrator 234 sends a sampling strobe signal to circuit 184 which samples and stores the magnitude of the unbalance signal at that instant to provide an indication on meter 188 of the amount of unbalance on the Nth or fourth blade. For the example being described, gate 240a is enabled in response to the first and fifth clock pulses 278 and so on, causing the unbalance signal to be sampled at a time indicated or designated at 284 (FIG. 9e). Although waveform 274 is the resultant balance signal prior to scaling via resistors 170, 176, it will be apparent that the waveform at the sample-and-hold circuits 184, 186 will be proportional to and in phase with the waveform 274. Additionally, since the sample is always taken at circuit 184 prior to the positive-going zero crossing, inverter 182 inverts the negative half cycle so that circuit 184 always samples a positive signal; and hence the samples taken at circuits 184, 186 will have the same polarity. Similarly, when gate 242a is enabled, multivibrator 238 sends a strobe signal to circuit 186 which samples and stores the magnitude of the unbalance signal at that instant for display at meter 190. Again in the example being described, the second sampling of the unbalance signal will be coincident with the second and sixth clock pulses 278 (FIG. 9d) and so on causing the unbalance signal to be sampled at times designated at 286. As might be expected for the example being described, where the unbalance vector has arbitrarily been assumed to be midway between the sector boundaries N and 1, the magnitude of the sampled unbalance signal at times 284, 286 are the same. As indicated earlier, the labels on lamps 230a-h are correlated to meters 188, 190 and to adjacent segments on the part in a clockwise direction. Hence for the four-bladed fan described, the mark (N,1) on lamp 230 indicates that the unbalance correction shown on meter 188 is to be made at blade N, i.e., the fourth blade, and the unbalance correction shown on meter 190 is to be made at the first blade.

The arrangement of transducers 110, 112 and the circuit illustrated in FIG. 7 will cause the unbalance signal to be sampled at the appropriate time to complete the computations required by the equations set forth hereinabove for $|S_n|$ and $|S_1|$. The summed unbalance signal is first multiplied by $1/\sin(a+b)$ and then in effect multiplied by sine b at circuit 184 and by sine a at circuit 186. In this regard, it will be noted that although the waveforms shown in FIG. 9 are not necessarily intended to be to scale, the amplitude at the sample times 284, 286 are approximately 0.707 of the peaked signal as expected where the angles a and b are 45°.

By way of further example, for the four-bladed fan 20, if it is assumed that the unbalance is coincident with the X axis, it will be seen that the resultant unbalance signal would be shifted 45° to the left as viewed in FIG 9e. Hence circuit 184 will sample the unbalance signal at its peak and circuit 186 will sample the unbalance signal at a zero crossing. Consequently, meter 188 will display the full unbalance correction to be made on the fourth blade and meter 190 will read zero.

It will be apparent that gate 242b is required where the unbalance is located between the segments (N−1) and N, i.e., between blades 3 and 4 in the case of a four-bladed fan. In response to an input at line 226d and a binary number on line 252 indicating that there are four boundaries, gate 242h will be readied by circuit 250. Line 226d will be activated and hence gate 240d will be enabled when the ONE in register 210 reaches the fourth register stage which causes the appropriate sampling for blade 3 to display the necessary unbalance correction on meter 188. However, since a four-bladed fan is being balanced, register 210 will activate line 216a but not line 216e so that gate 242d will not be enabled. However, when line 216a is activated, gate 242h is enabled to generate the necessary strobe signal for sample-and-hold circuit 186. Similarly, with a part having eight segments and the unbalance lies between segments 7 and 8, selector circuit 250 will have an input at line 226h to ready gate 242h. When the register reaches its eighth stage, gate 240h will be enabled by line 216h to generate the strobe signal for circuit 184; and then after register 210 is reset by the next clock pulse and the reset pulse, gate 242h will be enabled by the signal on line 216a to provide the necessary strobe signal for circuit 186.

Although the balancing machine and operation thereof have been described hereinabove for purposes illustration assuming a four-bladed fan, it will be apparent that a corresponding operation is achieved with the specific circuit disclosed for parts having up to eight segments. By way of futher illustration, switch arm 178 would be connected to resistor 170 for a part having three segments; to resistor 173 for a part having five segments; to resistor 174 for six segments; to resistor 175 for seven segments; and to resistor 176 for eight segments. Resistors 170 are weighted relative to the resistance of potentiometer 169 to perform the necessary scaling by a factor of $1/\sin(a+b)$. For a potentiometer 169 having a resistance of 1K ohms, resistors 170-176 would have the following values: Resistor 170 = 732 ohms; resistor 172 = 1,000 ohms; resistor 173 = 904 ohms; resistor 174 = 732 ohms; resistor 175 = 560 ohms; and resistor 175 = 414 ohms. By setting the number of blades or segments on switch 208, the appropriate resistor 170-176 is selected, the frequency output at multiplier 200 is selected, and the corresponding binary number is fed to the sector data 250 in decoder 218. Selector 250 is a conventional purchased component, for exaple, an eight-bit data selector, Model No. SN 74151N, sold commercially by Texas Instruments Inc.

It will be apparent that the present method and apparatus described hereinabove for balancing segmented parts have many advantages over prior art techinques. First the machine may be easily set for parts having a different number of segments at which weight can be added or subtracted. Although the circuit illustrated in FIG. 7 has been described for a maximum capability of eight segments, it will be readily apparent that the technique can be expanded to work with parts having more than eight segments. Lamps 230a-h quickly and unambiguously indicate to the operator the segments at which weight has to be added or subtracted. Additionally, the two separate meters 188, 190 also quickly and unambiguously indicate to the operator the amount of weight correction required at the blades indicated by the lamp. Although lamps marked with correction locations have been disclosed, it will be apparent that other methods could be used for indicating the segments requiring correction; for example, a digital readout that would display paired segment numerals in response to outputs on lines 244a-h. Light-emitting diodes could be energized directly by the low level signals available from latch 214. The circuit disclosed in FIG. 7 together with the orientation of transducers 110, 112 provide a simple manner of solving the equations that resolve unbalance into components at sector boundaries. Although quadrature signals on lines 118, 120 are preferred together with orthogonally oriented transducers 110, 112, angular separation between transducers 110, 112 other than 90° could be used. In such case, the corresponding signals at lines 118, 120 would be set at a corresponding phase displacement. Orthogonal positioning of transducers 110, 112 together with the quadrature oscillator 116 are preferred because commercially available quadrature oscillators have stable frequency outputs at a precise quadrature relationship. Although the preferred embodiment has been described hereinabove as applied to a static balancer, with minor modifications the same techniques can be used with a rotating balancer. Transducers 110, 112 would be replaced by suitable transducers such as seismic transducers to provide the input signals to preamps 130, 144. The synchronizing signal applied to multiplier 210 and synchronous reset circuit 202 via line 199 would be developed directly from the rotating part by suitable means, for example, a magnetic or reluctance pickup. The circuit of FIG. 7 is also potentially useful in a rotating balancer having only one transducer because the phase of the unbalance signal can be referenced to a location on the part by known techniques. Finally although electronic compensation for eccentricity is preferred, mechanical compensation could be used, for example, small weights adjustably positionable along the X and Y axes.

It will also be understood that the particular balancing machine and method for balancing segmented parts and the particular method and apparatus for stabilizing a spherical bearing have been described hereinabove for purposes of illustration and are not intended to indicate limits of the present invention, the scope of which is defined by the following claims.

We claim:

1. A balancing machine for use in balancing parts having a predetermined number of generally radially directed segments at which unbalance corrections can be made; each pair of adjacent segments defining a respective sector therebetween so that said part has a predetermined number of sectors, and wherein unbalance in said part may be represented by a radially directed vector located at a first included angle with respect to a first segment and at a second included angle with respect to a second segment adjacent said first segment, said first and said second segments defining a first sector therebetween, comprising pivotal support means adapted to receive said part and being mounted so that said support is free to move in response to unbalance of said part, transducer means responsive to movement of said support to provide an electrical unbalance signal, said transducer means including at least one transducer having a predetermined positioning relative to said support, first circuit means responsive to said unbalance signal for developing a first unbalance component signal representing a resolved component of said unbalance vector at said first segment, second circuit means responsive to said unbalance signal for developing a second unbalance component signal representing a resolved component of said unbalance vector at said second segment, first indicator means responsive to said first component signal to provide a first indication representing said first vector component, second indicator means responsive to said second component signal to provide a second indication representing said second vector component, first reference source means for providing a first reference signal whose phase is correlated to said predetermined positioning of said transducer means, third circuit means responsive to said unbalance signal and said first reference signal to provide a second electrical output signal identifying which sector is said first sector, and third indicating means responsive to said third output signal to identify said first and second segments.

2. The combination set forth in claim 1 wherein said transducer means includes first and second transducers arranged and disposed relative to said support to provide respective first and second pickup signals representing movement of said support along respective axes having a predetermined angular separation therebetween, input signal generating means for providing a first input signal and a second input signal having a predetermined phase displacement therebetween correlated to said predetermined angular separation between said axes, said first signal being coupled to said first transducer and said second signal being coupled to said second transducer, and means for summing said first and second pickup signals to develop said unbalance signal and wherein said reference signal is derived from one of said input signals.

3. The combination set forth in claim 2 wherein said first input signal has a predetermined frequency of $f_o$ and wherein said third circuit means comprises second input signal generating means synchronized by said first input signal for providing a second input signal having a frequency of $Nf_o$ where N is equal to said predetermined number of segments.

4. The combination set forth in claim 3 wherein said balancing machine is adapted for use in balancing parts having different predetermined numbers of segments at which unbalance corrections can be made and corresponding sectors therebetween, and further comprising first manually selectable means operable by an operator of said machine to vary the frequency of said second input signal corresponding to that predetermined number of segments contained on the part being balanced.

5. The combination set forth in claim 4 wherein said segments have equal included angles therebetween and wherein said combination further comprises means for attenuating said unbalance signal by a factor correlated to said equal included angle between adjacent segments on the part to be balanced, and wherein said first and said second circuit means are responsive to said attenuated unbalance signal.

6. The combination set forth in claim 5 wherein said attenuating means comprises a plurality of resistors selectable by said operator and having a value determined by the sine of said equal included angle between adjacent segments on the part to be balanced.

7. The combination set forth in claim 3 wherein said third circuit means further comprises shift register means having a plurality of stages and being clocked by said second input signal, synchronous reset circuit means responsive to said one input signal to reset said register means during each cycle of said one input signal, each of said register stages having a respective output corresponding to each of said segments, fourth circuit means responsive to said unbalance signal to provide a latch signal at a predetermined time during each cycle of said unbalance signal, latch circuit means responsive to said latch signal to store the count in said register means at said predetermined time, said latch circuit means having a respective output corresponding to each of said sectors, and wherein said third indicating means is responsive to said stored count to identify said first and second segments.

8. The combination set forth in claim 7 wherein said fourth circuit means comprises a zero crossing detector to provide said latch signal.

9. The combination set forth in claim 7 wherein said first circuit means comprises a first sample means for sampling said unbalance signal in response to a first strobe signal to develop said first component signal and wherein said second circuit means comprises second sample means for sampling said unbalance signal in response to a second strobe signal to develop said second component signal and wherein said third circuit means comprises decoder means responsive to said register outputs and said latch outputs to generate said first and second strobe signals.

10. The combination set forth in claim 9 wherein said balancing machine is adapted for use in balancing parts having different predetermined numbers of segments at which unbalance corrections can be made and corresponding sectors therebetween, and further comprising first manually selectable means operable by an operator of said machine to vary the frequency of said second input signal corresponding to that predetermined number of segments contained on the part being balanced.

11. The combination set forth in claim 10 wherein said segments have equal included angles therebetween and wherein said combination further comprises means for attenuating said unbalance signal by a factor correlated to said equal included angle between adjacent segments on the part to be balanced, and wherein said first and second circuit means are responsive to said attenuated unbalance signal.

12. The combination set forth in claim 11 wherein said attenuating means comprises a plurality of resistors selectable by said operator and having a value determined by the sine of said equal included angle between adjacent segments on the part to be balanced.

13. The combination set forth in claim 9 wherein said decoder means comprises a plurality of gating circuits arranged in pairs, a first gating circuit in each pair having a first input from one of said register stage outputs and a second input from one of said latch circuit means outputs associated with said one register stage, and the second gating circuit in said pair having a first input from said one output of said latch circuit means and a second input from another of said register stage outputs which is the next adjacent register stage to said one register stage, and wherein said first strobe signal is developed in response to one of said gating circuits in each pair and said second strobe signal is developed in response to the other gating circuit in each pair.

14. The combination set forth in claim 2 wherein said support movement axes have an angular separation of 90°, said first and second transducers are disposed at substantially 90° to each other, and wherein one of said input signals is a sine function signal and the other of said input signals is a cosine function signal.

15. The combination set forth in claim 2 further comprising first compensation circuit means having an input coupled to said input signal generating means to receive said first input signal and an output coupled to said summing means to supply a first compensation signal thereto and second compensation circuit means having an input coupled to said input signal generating means to receive said second input signal and an output coupled to said summing means to supply a second compensation signal thereto, said first and said second compensation circuit means each comprising means to vary the amplitude and polarity of its respective compensation output signal relative to its respective input signal.

16. The combination set forth in claim 1 wherein said balancing machine is adapted for use in balancing parts having different predetermined numbers of segments at which unbalance corrections can be made and corresponding sectors therebetween, and further comprising first manually selectable means operable by an operator of said machine to vary the magnitude of said unbalance signal according to that predetermined number of segments of a part to be balanced.

17. The combination set forth in claim 16 wherein said first circuit means comprises a first sample means for sampling said unbalance signal in response to a first strobe signal to develop said first component signal, said second circuit means comprises second sample means for sampling said unbalance signal in response to a second strobe signal to develop said second component signal and wherein said third circuit means further comprises means for generating said first and said second strobe signals at time separated positions and second manually selectable means operable by an operator of said machine to vary said time separation between said first and second strobe signals according to that predetermined number of segments of a part to be balanced.

18. A balancing machine for use in balancing parts having different predetermined numbers of generally radially directed segments at which unbalance corrections can be made comprising support means adapted to receive said part and being mounted so that said support is displaced in response to unbalance of said part, transducer means responsive to displacement of said support to provide an electrical unbalance signal, first manually selectable means operable by an operator of said machine to vary the magnitude of said unbalance signal according to that particular number of segments of a part to be balanced, first sample means for sampling said unbalance signal in response to a first strobe signal to develop a first unbalance component signal, second sample means for sampling said unbalance signal in response to a strobe signal to develop a second unbalance component signal, means for generating said first and said second strobe signals at time separated positions and second manually selectable means operable by a operator of said machine to vary said time separation between said strobe signals according to that particular predetermined number of segments of a part to be balanced.

19. The combination set forth in claim 18 wherein said transducer means includes first and second transducers arranged and disposed relative to said support to provide respective first and second pickup signals representing movement of said support along respective axes having a predetermined angular separation therebetween, input signal generating means for providing a first input signal and a second input signal having a predetermined phase displacement therebetween correlated to said predetermined angular separation between said axes, said first signal being coupled to said first transducer and said second signal being coupled to said second transducer, and means for summing said first and said second pickup signals to develop said unbalance signal.

20. The combination set forth in claim 18 further comprising first indicator means responsive to said first component signal to provide a first indication representing the magnitude of said first unbalance component signal and second indicator means responsive to said second component signal to provide a second indication representing the magnitude of said second unbalance component signal.

21. The combination set forth in claim 20 wherein said transducer means includes at least one transducer having a predetermined positioning relative to said support and wherein said combination further comprises means for providing a first reference signal whose phase is correlated to said predetermined positioning of said transducer, third circuit means responsive to said unbalance signal and said first reference signal to provide an output signal identifying two of said segments at which unbalance corrections are to be made, and third indicating means responsive to said output signal to identify said two segments.

22. In the method of balancing different parts having different predetermined numbers of generally radially directed segments at which unbalance corrections can be made, the steps of supporting on a pivotal support a first part having a first predetermined number of segments, detecting displacement of said support in response to unbalance in said part to thereby develop an electrical signal representing said unbalance in said part, modifying said unbalance signal by a first factor determined by said first predetermined number, sampling said unbalance signal at a first phase position to resolve unbalance in said part into a first unbalance component at a first of said segments and then sampling said unbalance signal at a second phase position displaced from said first phase position according to said predetermined number to resolve unbalance in said part into a second unbalance component at a second of said segments immediately adjacent said first segment, said phase displacement between said first and second samples being a function of said first predetermined number.

23. The method set forth in claim 22 wherein unbalance for a second part having a second predetermined number of segments is determined by supporting said second part on said pivotal support, detecting displacement of said support in response to a second unbalance in said second part to thereby develop an electrical signal representing said second unbalance, modifying said unbalance signal by a second factor determined by said second predetermined number and sampling said unbalance signal at third and fourth phase positions to resolve said second unbalance in said second part to two unbalance components at respective adjacent segments on said second part, said third and fourth phase positions having a separation therebetween determined by said second predetermined number.

24. The method set forth in claim 22 wherein displacement of said support is detected along two axes having a predetermined angular separation therebetween.

25. The method set forth in claim 22 wherein said unbalance signal is modified by attenuating said unbalance signal by a factor determined by said first predetermined number.

26. The method set forth in claim 22 wherein displacement of said support is detected by transducer means having a predetermined positioning relative to said support and wherein said method further comprises providing a first phase reference signal having a frequency determined by said first predetermined number and then identifying said first segment and said second segment in accordance with the phase relationship of said unbalance signal to said reference signal.

* * * * *